US009751460B1

(12) United States Patent
Iordache et al.

(10) Patent No.: US 9,751,460 B1
(45) Date of Patent: Sep. 5, 2017

(54) ILLUMINATED CUP HOLDER ASSEMBLY

(71) Applicant: Tyco Electronics Canada ULC, Markham (CA)

(72) Inventors: Lucian Iordache, Woodbridge (CA); Nelson Yu, Thornhill (CA); Andras Gyimes, Toronto (CA)

(73) Assignee: TYCO ELECTRONICS CANADA ULC, Markham (CA)

( * ) Notice: Subject to any disclaimer, the term of this patent is extended or adjusted under 35 U.S.C. 154(b) by 0 days.

(21) Appl. No.: 15/051,061

(22) Filed: Feb. 23, 2016

(51) Int. Cl.
| F21V 33/00 | (2006.01) |
| B60Q 3/02 | (2006.01) |
| F21V 5/04 | (2006.01) |
| F21V 23/00 | (2015.01) |
| F21Y 115/10 | (2016.01) |

(52) U.S. Cl.
CPC .............. B60Q 3/0243 (2013.01); F21V 5/04 (2013.01); F21V 23/003 (2013.01); F21Y 2115/10 (2016.08)

(58) Field of Classification Search
CPC .......... B60N 3/10; B60N 3/101; B60N 3/108; B60Q 3/00; B60Q 3/20; B60Q 3/225; F21S 48/00
USPC .................................... 362/154, 488, 249.02
See application file for complete search history.

(56) References Cited

U.S. PATENT DOCUMENTS

| 8,162,520 | B2 * | 4/2012 | Penner | B60N 3/101 |
| | | | | 362/154 |
| 8,353,604 | B2 * | 1/2013 | Glazier | B60Q 3/20 |
| | | | | 362/101 |
| 8,485,680 | B2 * | 7/2013 | Anderson | B60N 3/108 |
| | | | | 224/926 |
| 9,068,708 | B2 * | 6/2015 | Antilla | B60N 3/101 |
| 9,538,874 | B2 * | 1/2017 | Salter | B60N 3/101 |
| 2012/0075842 | A1 | 3/2012 | Goto | |
| 2016/0046233 | A1 * | 2/2016 | Hansen | B60N 3/101 |
| | | | | 362/509 |

FOREIGN PATENT DOCUMENTS

| WO | 2014058544 A1 | 4/2014 |
| WO | 2014165597 A2 | 10/2014 |

* cited by examiner

*Primary Examiner* — Seung Lee

(57) ABSTRACT

A cup holder assembly includes a lens and a cup holder liner. The lens is configured to receive light from a light source and direct the light towards a perimeter edge of the lens. The cup holder liner is composed of a light transmissive material and is disposed above the lens. The cup holder liner includes a peripheral wall that has an interior surface defining a receptacle. The lens extends beyond an exterior surface of the peripheral wall to define a perimeter edge segment of the lens that protrudes from the exterior surface of the peripheral wall to the perimeter edge of the lens. The lens is configured to emit light from the perimeter edge segment into the peripheral wall through the exterior surface thereof to illuminate the interior surface of the peripheral wall of the cup holder liner.

20 Claims, 5 Drawing Sheets

ILLUMINATED CUP HOLDER ASSEMBLY

BACKGROUND OF THE INVENTION

The subject matter described herein relates generally to a cup holder assembly, and, more particularly, to a cup holder assembly that is illuminated.

Vehicles typically include cup holders to retain beverages while the vehicle is being operated. However, many conventional cup holders are difficult to see. In particular, the cup holder may be difficult to see in dark environments, such as while driving in the evening. Some cup holders have a dark color to match an interior of the vehicle. The dark color of the cup holder further limits the ability for an operator and/or a passenger to see the cup holder. Inability to see the cup holder may result in beverages being spilled in the vehicle. A spilled beverage may damage the interior of the vehicle. Additionally, a spilled beverage may distract the operator, causing an accident, and/or may seriously injure the operator and/or a passenger, such as if the beverage has a high temperature.

Some lighting systems have been incorporated into conventional cup holders. The lighting systems may include a ring of lights around an exterior of the cup holder. Other lighting systems include illuminated discs that are positioned within the cup holder. The illuminated discs are joined to a cable that plugs into a power source of the vehicle, for example, a cigarette lighter.

However, conventional lighting systems for cup holders are not without their disadvantages. Some conventional lighting systems only illuminate an edge around the cup holder. Accordingly, the cavity of the cup holder is not illuminated. Such lighting systems may not illuminate objects that are already positioned within the cup holder, so a person may not see that a cup holder is occupied by an object. Placing a beverage into a cup holder having an object therein may result in the beverage spilling.

Other lighting systems are not built into the cup holder. These lighting systems include cords and wires that extend from the cup holder. The cords and wires may clutter the interior of the vehicle. The cords and wires may also create difficulty when placing a beverage into the cup holder. Additionally, the cords and wires may interfere with the operator's ability to operate the vehicle, thereby potentially resulting in an accident.

SUMMARY OF THE INVENTION

In one embodiment, a cup holder assembly is provided that includes a lens and a cup holder liner. The lens extends radially to a perimeter edge. The lens is configured to receive light from a light source and direct the light towards the perimeter edge. The cup holder liner is composed of a light transmissive material and is disposed above the lens. The cup holder liner includes a peripheral wall that extends between a top end and a bottom end. An interior surface of the peripheral wall defines a receptacle that is open at the top end of the peripheral wall. The lens extends beyond an exterior surface of the peripheral wall to define a perimeter edge segment of the lens that protrudes from the exterior surface of the peripheral wall to the perimeter edge of the lens. The lens is configured to emit light from the perimeter edge segment into the peripheral wall through the exterior surface thereof to illuminate the interior surface of the peripheral wall.

In another embodiment, a cup holder assembly is provided that includes a cup holder body, a cup holder liner, and a lens. The cup holder body has a side wall. The side wall includes an inner surface that defines a cavity of the cup holder body. The cup holder liner is composed of a light transmissive material. The cup holder liner includes a peripheral wall disposed in the cavity. The peripheral wall extends between a top end and a bottom end. An interior surface of the peripheral wall defines a receptacle that is open at the top end of the peripheral wall. An exterior surface of the peripheral wall is spaced apart radially from the inner surface of the side wall to define a radial gap. The lens is disposed in the cavity of the cup holder body below the cup holder liner. The lens extends radially to a perimeter edge. The lens extends beyond the exterior surface of the peripheral wall to define a perimeter edge segment of the lens that protrudes from the exterior surface of the peripheral wall to the perimeter edge of the lens. The lens is configured to emit light from the perimeter edge segment into the radial gap, the peripheral wall of the cup holder liner receiving light therein from the radial gap through the exterior surface to illuminate the interior surface.

DETAILED DESCRIPTION OF THE DRAWINGS

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "an embodiment" and "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

One or more embodiments disclosed herein include an illuminated cup holder assembly that is configured to provide an optical fading effect along a height of the cup holder. For example, the illuminated cup holder may illuminate an interior surface of the cup holder such that the interior of the cup holder appears to glow. The light emitted from the interior surface of the cup holder may be brighter (for example, have a greater luminous intensity) towards a bottom or base of the cup holder than the light emitted from the interior surface near a top or inlet of the cup holder. The optical fading effect may be configured such that the brightness of the light fades gradually from the bottom of the cup holder towards the top of the cup holder. The illuminated interior surface of the cup holder allows an operator and/or passenger in a vehicle to see the location of the cup holder in dark lighting conditions, such as when driving at night or through a tunnel. The illuminated interior surface also may reflect upon an object within the cup holder, providing a visual indication that the cup holder is occupied. Thus, the illuminated cup holder may prevent or at least reduce the occurrence of spilled beverages by providing a visual indication of the location of the cup holder and whether the cup holder is currently occupied by an object. Furthermore, the illuminated cup holder assembly may be illuminated by a single light source below the base of the cup holder. Thus, the light source does not interfere with the object in the cup holder, and the brightness of the light may be substantially uniform along a perimeter of the cup holder. Additionally, the optical fading effect of the cup holder may be appreciated for aesthetic reasons.

Figure 1:
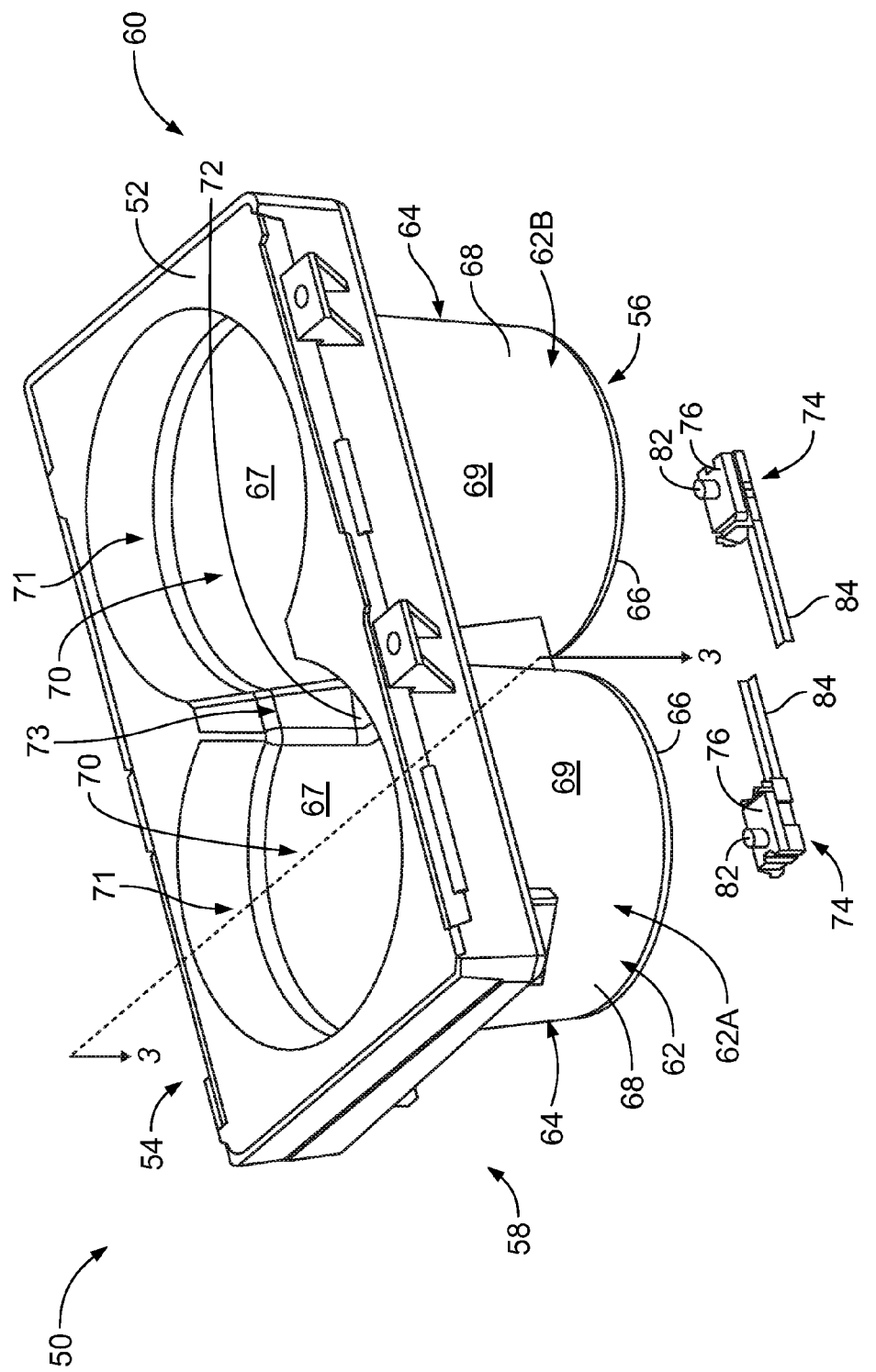
FIG. 1 illustrates a partially-exploded cup holder assembly according to an embodiment.

FIG. 1 illustrates a partially-exploded cup holder assembly 50 according to an embodiment. The cup holder assembly 50 includes a housing 52 and at least one light assembly 74. The housing 52 has a top 54 and a bottom 56. The housing 52 includes a first end 58 and a second end 60. As used herein, relative or spatial terms such as "top," "bottom," "front," "rear," "left," and "right" are only used to distinguish the referenced elements and do not necessarily require particular positions or orientations of the cup holder assembly 50 relative to the surrounding environment of the cup holder assembly 50. The housing 52 is configured to be inserted into a vehicle (not shown) or the like. The housing 52 may be inserted into a console (not shown) of a vehicle. The housing 52 includes two cup holders 62. In another embodiment, the housing 52 may include any number of cup holders 62. In the illustrated embodiment, the cup holders 62 are positioned adjacent one another.

Each cup holder 62 includes a cup holder body 64, which may be referred to herein as body 64. The body 64 includes a bottom wall 66 and a side wall 68. In the illustrated embodiment, the bottom wall 66 has a circular shape. The bottom wall 66 of the respective cup holder 62 is positioned at the bottom 56 of the housing 52. The side wall 68 of the respective cup holder 62 extends from the bottom wall 66 of the cup holder 62. The side wall 68 has a cylindrical configuration in the illustrated embodiment, but may have another suitable shape, such as conical, a rectangular prism shape, or the like, in another embodiment. The side wall 68 includes an inner surface 67 and an outer surface 69. The bottom wall 66 of the cup holder 62 and the side wall 68 of the cup holder 62 define a cavity 70. The inner surface 67 of the side wall 68 is a peripheral surface that defines a side of the cavity 70. The cavity 70 has an opening 71 at the top 54 of the housing 52. The cavity 70 is configured to receive a cup holder liner 102 (shown in FIG. 2) therein.

One cup holder 62A is positioned adjacent to the first end 58 of the housing 52. The other cup holder 62B is positioned adjacent to the second end 60 of the housing 52. The cavities 70 of the cup holders 62A, 62B are divided by a partition 72. The partition 72 extends from the bottom 56 of the housing 52 partially towards the top 54 of the housing 52. The cavities 70 are separated by a gap 73 proximate to the top 54 of the housing 52. The gap 73 is oriented above the partition 72. The cavities 70 of the cup holders 62A, 62B have respective depths defined between the top 54 of the housing 52 and the respective bottom wall 66 of the cup holders 62A, 62B. In the illustrated embodiment, the depth of the cup holder 62B is greater than the depth of the cup holder 62A. The relative depths of the cup holders 62A, 62B may be based on a contour of the console into which the cup holder assembly 50 is loaded.

Each of the cup holders 62A, 62B is operably coupled to a different, discrete lighting assembly 74 such that one lighting assembly 74 is operably coupled to the cup holder 62A and another lighting assembly 74 is operably coupled to the cup holder 62B. In an alternative embodiment, the cup holders 62A, 62B may both be operably coupled to a single lighting assembly 74. Each lighting assembly 74 may be mounted to an exterior surface (not shown) of the bottom wall 66 of the respective cup holder 62A, 62B. The two lighting assemblies 74 may be substantially similar or identical such that the following description applies to both lighting assemblies 74. The light assembly 74 is configured to be housed within an interior portion, such as a console, of the vehicle. The light assembly 74 is configured to be isolated from an operator and/or a passenger of the vehicle.

The lighting assembly 74 includes a light emitting device or light source 82. The light source 82 may be a light emitting diode (LED). Optionally, the light source 82 may be a tri-color red green blue (RGB) LED that is configured to be able to emit red light, green light, blue light, and/or combinations thereof to create many different colors and shades of light. Alternatively, the light source 82 may be a monochromatic LED light that emits monochromatic white light. In alternative embodiments, the light source 82 of one or both lighting assemblies 74 may be an incandescent bulb, a compact fluorescent lamp (CFL) bulb, or the like, instead of an LED. The light source 82 is configured to provide light into the cavity 70 of the respective cup holder 62 through an opening in the bottom wall 66.

The light source 82 is operatively coupled to a light engine 76. The light engine 76 includes drivers, controllers, power sources such as batteries, and/or associated circuitry for controlling the optical characteristics of the light generated by the light source 82. At least some of the drivers, controllers, power sources, and/or associated circuitry may be embedded or otherwise contained on a printed circuit board (PCB). The light engine 76 receives power and/or control signals via electrical leads 84 and/or wires that extend remotely to connect to a remote power source and/or controller in the vehicle. The light engine 76 may be joined to a switch that operates the light assembly 74. Although one light source 82 is associated with each light engine 76 in the illustrated embodiment, in other embodiments a single light engine 76 may control operation of multiple light sources 82.

Figure 2:
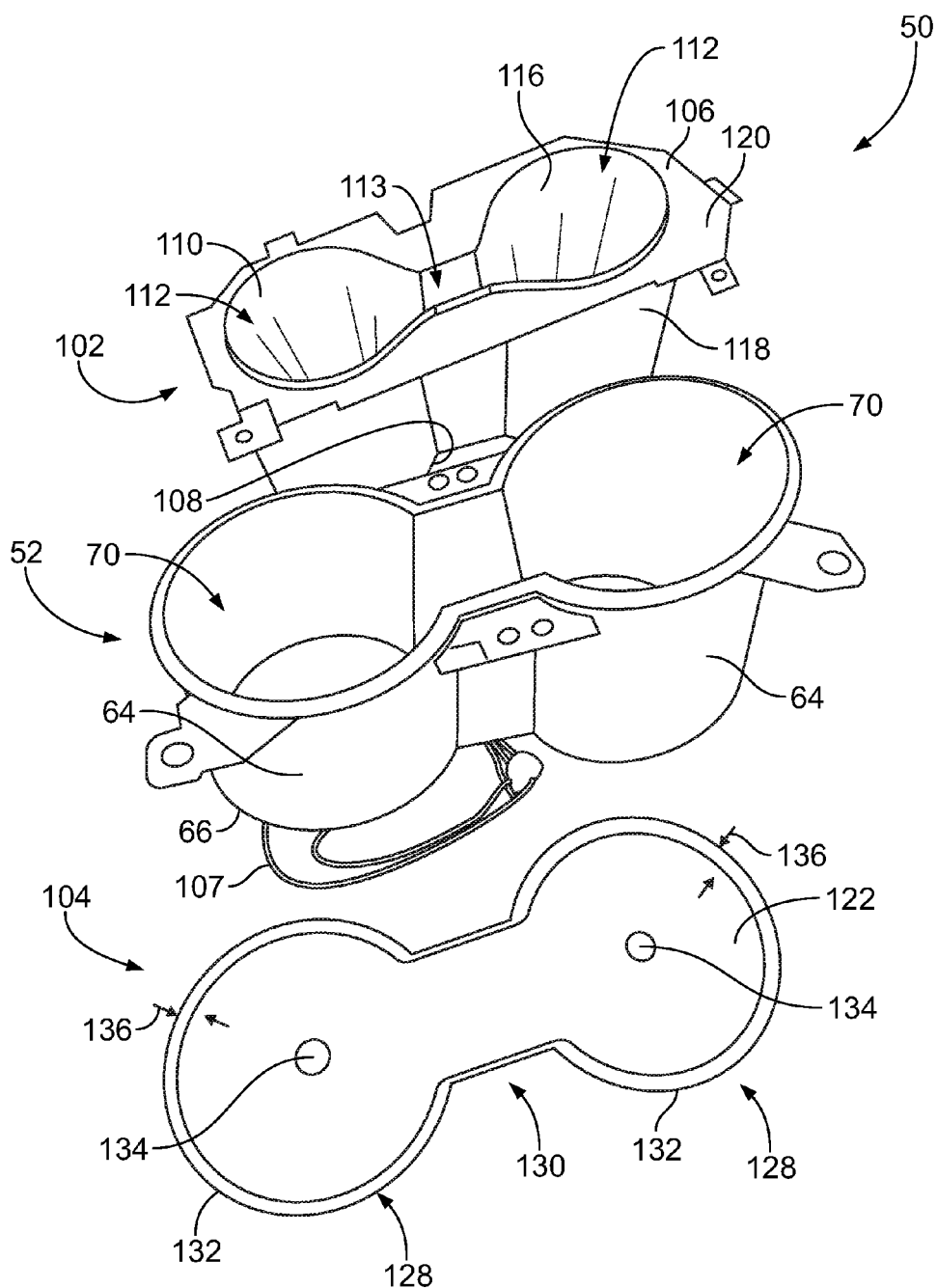
FIG. 2 is an exploded perspective view of the cup holder assembly according to an embodiment.

FIG. 2 is an exploded perspective view of the cup holder assembly 50 according to an embodiment. The cup holder assembly 50 includes the housing 52 and the at least one light assembly 74 (shown in FIG. 1), and further includes a cup holder liner 102 and a lens 104. Only wires 107 that protrude from the at least one light assembly 74 located below the bottom walls 66 of the cup holder bodies 64 are visible in FIG. 2. The cup holder liner 102 (also referred to herein as liner 102) is configured to be received within the cavities 70 of the cup holder bodies 64. The lens 104 is configured to be received within the cavities 70 below the liner 102. The lens 104 receives light from the light sources 82 (shown in FIG. 1) and directs the light towards the liner 102. The liner 102 is composed of a light transmissive material such that the liner 102 is translucent. The light from the lens 104 that is received within the liner 102 causes the liner 102 to glow within the housing 52. As described in more detail herein, the liner 102 is configured to provide an optical fading effect such that a brightness of the liner 102 diminishes gradually along a height of the liner 102.

The cup holder liner 102 has a peripheral wall 110 that extends between a top end 106 and a bottom end 108. The peripheral wall 110 defines a perimeter contour of at least one receptacle 112. For example, the peripheral wall 110 may define a closed curved structure, such as a cylindrical structure or an elliptical structure. In the illustrated embodiment, the peripheral wall 110 has a lemniscate or figure-eight shape that defines two receptacles 112 and a narrow portion 113 between the two receptacles 112. The portion of the peripheral wall 110 that defines each receptacle 112 optionally may have a conical shape such that a diameter of the receptacle 112 at the top end 106 is greater than a diameter of the receptacle 112 at the bottom end 108. Each receptacle 112 is received in a corresponding one of the cavities 70 of the housing 52. Each receptacle 112 is configured to receive a beverage container therein. The peripheral wall 110 of the liner 102 may engage sides of the container to support the container in an upright position. The liner 102 is composed of a light transmissive material, such as polypropylene, polycarbonate, a perfluorinated polymer, or another polymer. The liner 102 includes an interior surface 116 and an exterior surface 118. The interior surface 116 defines the receptacles 112. The liner 102 is translucent to allow the transmission of light through an interior region of the liner 102 between the exterior surface 118 and the interior surface 116.

The liner 102 may further include a bottom wall 114 (shown in FIG. 3) at the bottom end 108 of the peripheral wall 110. The bottom wall 114 engages the peripheral wall 110 along the perimeter contour of the receptacles 112. For example, the peripheral wall 110 may extend from the bottom wall 114. The receptacles 112 are defined by the bottom wall 114 and the peripheral wall 110. The receptacles 112 are open at the top end 106 of the peripheral wall 110 to allow the beverage containers and other objects to be received in the receptacles 112. The bottom wall 114 may be integral to the peripheral wall 110. The liner 102 may be formed via a molding process. The liner 102 also includes a lip 120 at or proximate to the top end 106 of the peripheral wall 110. The lip 120 extends laterally outward from the peripheral wall 110 and is configured to be secured to the housing 52 to affix the liner 102 to the housing 52.

Figure 3:
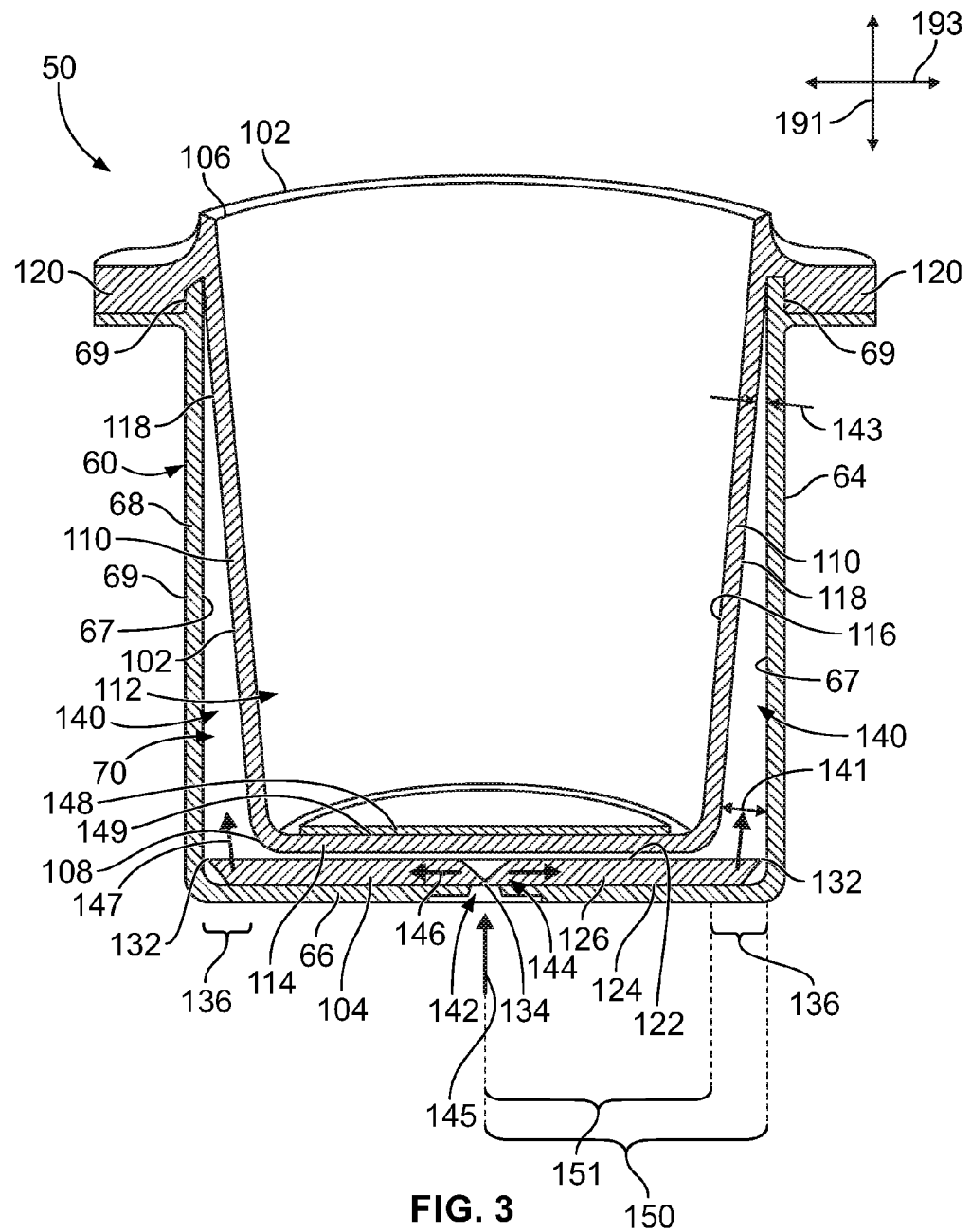
FIG. 3 is a cross-sectional view of the cup holder assembly along line 3-3 shown in FIG. 1.

The lens 104 is substantially planar and includes a top side 122 and an opposite bottom side 124 (shown in FIG. 3). The top side 122 and/or the bottom side 124 is a planar surface. The lens 104 has a solid interior region 126 (shown in FIG. 3) between the top and bottom sides 122, 124. The lens 104 is composed of a light transmissive material, such as glass or acrylic. The lens 104 may be clear and transparent, or at least translucent, to allow the transmission of light through the interior region 126. The lens 104 may be formed via a molding process, a punching or stamping process, or the like.

The shape of the lens 104 corresponds to the shape of the cavities 70 of the housing 52, as the lens 104 is received in the cavities 70 during assembly of the cup holder assembly 50. The lens 104 in the illustrated embodiment includes two disc portions 128 and a bridge portion 130 that connects the two disc portions 128. The disc portions 128 are substantially circular. The lens 104 includes a perimeter edge 132 that defines the perimeter of the lens 104. The disc portions 128 extend radially to the perimeter edge 132 from respective center locations 134. The lens 104 is configured to receive light from the light sources 82 (shown in FIG. 1) and direct the light towards a perimeter edge segment 136 of the lens 104. The perimeter edge segment 136 of the lens 104 extends along the perimeter of the lens 104 and includes the perimeter edge 132. For example, the perimeter edge segment 136 may extend from the perimeter edge 132 at least a slight distance radially towards the center locations 134. The lens 104 is configured to emit at least some of the light that is within the interior region 126 (shown in FIG. 3) from the lens 104 along the perimeter edge segment 136, as described in more detail herein. In an alternative embodiment, the cup holder assembly 50 may include two discrete disc-shaped lenses that are each received in one cavity 70 of the housing 52 instead of the single lens 104 shown in FIG. 2.

FIG. 3 is a cross-sectional view of the cup holder assembly 50 along line 3-3 shown in FIG. 1. The cross-section extends through one of the cup holder bodies 64 of the housing 52 (shown in FIG. 1), such that a single cup holder 62 is visible. The light assembly 74 (shown in FIG. 1) of the cup holder assembly 50 is not shown in FIG. 3. The cup holder assembly 50 is oriented with respect to a vertical or elevation axis 191 and a lateral axis 193 that are mutually perpendicular. Although the elevation axis 191 appears to extend in a vertical direction parallel to gravity, it is understood that the axes 191, 193 are not required to have any particular orientation with respect to gravity. The cup holder liner 102 is disposed in the cavity 70 above the lens 104. The lens 104 may be secured to the bottom wall 66 of the body 64 via a mechanical fastener or an adhesive, or, alternatively, may be mechanically constrained in the cavity 70 between the bottom wall 66 of the body 64 below and the bottom wall 114 of the liner 102 above. The liner 102 is inserted into the cavity 70 such that the side wall 68 of the body 64 surrounds the peripheral wall 110 of the liner 102. The liner 102 may be secured to the body 64 by the lip 120 of the liner 102 that extends radially outward from the exterior surface 118 of the peripheral wall 110. The lip 120 may engage the outer surface 69 of the side wall 68.

The liner 102 and the body 64 are spaced apart radially to define a radial gap 140 that extends between the exterior surface 118 of the peripheral wall 110 and the inner surface 67 of the side wall 68. In an embodiment, the radial gap 140 is a space occupied by air or other gases. The side wall 68 of the body 64 has a greater diameter than a diameter of the peripheral wall 110 along at least a portion of a height of the cup holder assembly 50 along the elevation axis 191. The radial gap 140 extends annularly around at least a majority of the circumference of the peripheral wall 110. In the illustrated embodiment, the side wall 68 has a cylindrical shape with a generally uniform diameter along the height of the side wall 68. The peripheral wall 110 has a conical shape such that the diameter of the peripheral wall 110 is greater at the top end 106 than at the bottom end 108 of the liner 102. As a result, the radial gap 140 has a non-uniform radial width along the height of the cup holder assembly 50. The width 141 of the radial gap 140 at the bottom end 108 is greater than the width 143 of the radial gap 140 proximate to the top end 106. Optionally, the radial gap 140 terminates at the top end 106 of the liner 102. For example, the lip 120 extends across the radial gap 140 to engage the side wall 68, defining an end of the radial gap 140.

The cross-section shown in FIG. 3 extends through one of the disc portions 128 (shown in FIG. 2) of the lens 104. The bottom side 124 of the lens 104 may abut the bottom wall 66 of the body 64. The bottom wall 66 defines an aperture 142 therethrough to provide an optical path from the light source 82 (shown in FIG. 1) to the lens 104. The lens 104 is configured to receive light from the light source 82 through the bottom side 124. In an embodiment, the aperture 142 aligns with a central area 144 of the lens 104. The central area 144 encompasses the center location 134 of the disc portion 128. As described below, the lens 104 receives light within the interior region 126 and directs the light radially outwards towards the perimeter edge 132 via internal reflections. The lens 104 is further configured to emit light from the top side 122 of the lens 104 along the perimeter edge segment 136. The light is emitted generally vertically in the cavity 70 towards and into the radial gap 140.

In an embodiment, a diameter 150 of the lens 104 along the top side 122 is greater than an outer diameter 151 of the peripheral wall 110 at the bottom end 108. The perimeter edge 132 extends radially beyond the exterior surface 118 of the peripheral wall 110. The perimeter edge segment 136 of the lens 104 extends beyond the exterior surface 118 and aligns generally with the radial gap 140. For example, the perimeter edge segment 136 may be defined as the portion of the lens 104 that extends radially beyond the exterior surface 118 to the perimeter edge 132 and aligns with the radial gap 140. The perimeter edge segment 136, the perimeter edge segment 136 emits light into the radial gap 140. More specifically, at least a majority of the light emitted from the top side 122 of the lens 104 along the perimeter edge segment 136 is received in the radial gap 140 between the liner 102 and the body 64.

The lens 104 directs light received from the light source 82 (shown in FIG. 1) along a defined optical path. The optical path includes a first segment 145 that extends generally vertically upwards from the light source 82 to the central area 144 of the lens 104, a second segment 146 that extends generally radially outwards (along the lateral axis 193) toward the perimeter edge 132 of the lens 104, and a third segment 147 that extends generally vertically upwards from the perimeter edge segment 136 into the radial gap 140. Thus, the lens 104 is configured to distribute light from a single light source 82 into the radial gap 140 around the perimeter of the liner 102. The lens 104 may distribute the light generally evenly around the perimeter of the liner 102.

The exterior surface 118 of the peripheral wall 110 of the liner 102 receives at least some of the light that is emitted into the radial gap 140. For example, the light impinges upon the exterior surface 118. The inner surface 67 of the body 64 may be reflective to reflect light that is in the radial gap 140 towards the exterior surface 118 of the peripheral wall 110. For example, the inner surface 67 may have a mirrored surface or may be polished to prohibit the side wall 68 from absorbing the light in the radial gap 140 (allowing more light to be absorbed by the peripheral wall 110). The light may be received in and transmitted through the peripheral wall 110 to illuminate the peripheral wall 110. For example, at least some light may be emitted through the interior surface 116 of the peripheral wall 110 into the receptacle 112, which illuminates the interior surface 116. In an embodiment, the cup holder assembly 50 provides an optical fading effect that illuminates the interior surface 116 along the height of the peripheral wall 110. In the optical fading effect, more light is emitted through the interior surface 116 near the bottom end 108, and less light is emitted through the interior surface 116 near the top end 106. As a result, the illuminated interior surface 116 of the peripheral wall 110 appears brighter at the bottom end 108 compared to the top end 106. The fading, or reduction in luminous intensity, may be gradual along the height of the peripheral wall 110.

Optionally, the cup holder assembly 50 may further include an insert 148 that is received in the receptacle 112 of the liner 102. In the illustrated embodiment, the insert 148 is a flat wafer or layer that is disposed on the bottom wall 114 of the liner 102. The insert 148 may be secured to the bottom wall 114 via an adhesive or the like. The insert 148 is configured to limit and/or block illumination of an interior surface 149 of the bottom wall 114. For example, the insert 148 may be opaque such that the insert 148 absorbs light emitted from the interior surface 149 below the insert 148. The insert 148 may be rubberized in order to grip the bottom of a beverage container that is within the receptacle 112. The insert 148 may include a particular perimeter contour and/or cut-out sections to define the shape of various insignia, such as logos, brand names, or the like. In an alternative embodiment, the insert 148 may extend vertically along at least a portion of the interior surface 116 of the peripheral wall 110. In another alternative embodiment, the insert 148 may be light transmissive and tinted in order to modify the color or other optical characteristics of the light emitted through the liner 102.

Although not shown in FIG. 3, a cover optionally may be disposed on the top side 122 of the lens 104 and/or on a bottom side of the bottom wall 114 of the liner 102 in order to restrict light transmission from the lens 104 directly into the bottom wall 114 of the liner 102. In one or more embodiments, the lens 104 is configured to direct light into the liner 102 through the exterior surface 118 of the peripheral wall 110.

Figure 4:
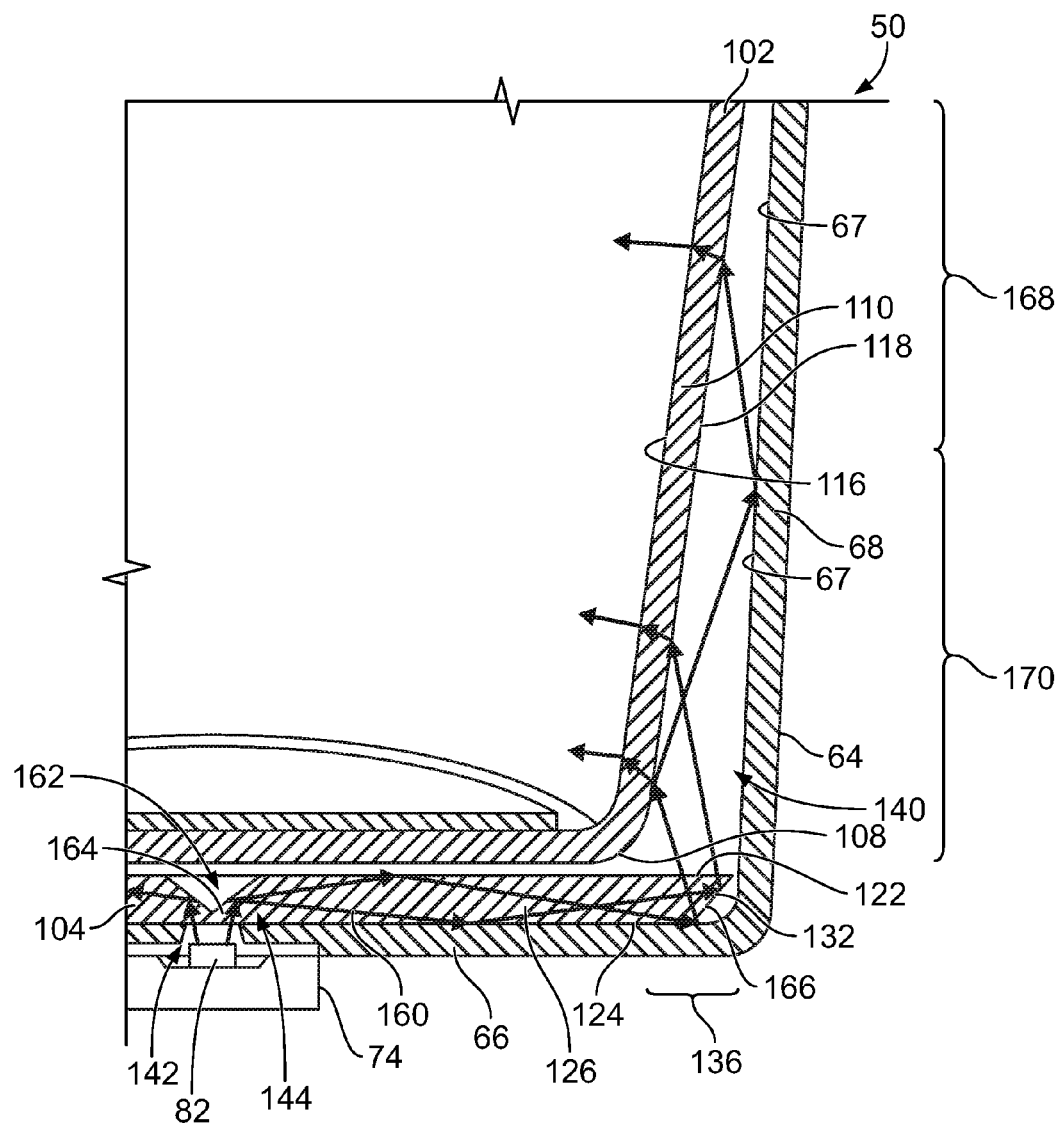
FIG. 4 is an expanded view of a portion of the cup holder assembly shown in FIG. 3, showing a tracing analysis of light propagation within the cup holder assembly.

FIG. 4 is an expanded view of a portion of the cup holder assembly 50 shown in FIG. 3, showing a tracing analysis of light propagation within the cup holder assembly 50. The light assembly 74 is shown attached to the bottom wall 66 of the body 64 such that the light source 82 aligns with the aperture 142 of the bottom wall 66. The tracing analysis represents light that is emitted by the light source 82. Potential light rays from the light source 82 are represented by arrows 160.

The lens 104 includes a notch 162 formed in the interior region 126 of the lens 104. The notch 162 is located within the central area 144 of the lens 104, such that the notch 162 is spaced apart from the perimeter edge 132. The notch 162 is aligned with the aperture 142 and the light source 82 disposed therein. The notch 162 includes at least one first angled surface 164. Light from the light source 82 is received in the interior region 126 of the lens 104 and impinges upon the first angled surface 164. The angled surface 164 is configured to reflect light from the light source 82 generally laterally through the interior region 126 towards the perimeter edge 132. In one embodiment, the notch 162 is conical, and the first angled surface 164 defines the cone shape. The first angled surface 164 is configured to reflect light radially 360 degrees through the lens 104 towards the perimeter edge 132. In an alternative embodiment, the notch 162 may be pyramidal, such that the at least one first angled surface 164 includes at least three angled surfaces that define the pyramid shape.

The lens 104 further includes a second angled surface 166 that is disposed at least partially along or within the perimeter edge segment 136 of the lens 104. The second angled surface 166 may extend circumferentially along the perimeter of the lens 104. The second angled surface 166 is configured to reflect light that impinges upon the angled surface 166 from the interior region 126 generally vertically upwards towards the top side 122 of the lens 104. The light is directed towards the top side 122 to emit the light from the top side 122 along the perimeter edge segment 136 such that the light is received within the radial gap 140. In the illustrated embodiment, the perimeter edge 132 is beveled to define the second angled surface 166. For example, the perimeter edge 132 is angled such that the top side 122 of the lens 104 along the disc portion 128 (shown in FIG. 2) has a greater diameter than the bottom side 124 of the lens 104. In an alternative embodiment, the second angled surface 166 may be a reflective material that is embedded within the lens 104.

The light that is received in the radial gap 140 from the lens 104 may reflect between the exterior surface 118 of the peripheral wall 110 of the liner 102 and the inner surface 67 of the side wall 68 of the cup holder body 64 as the light propagates generally upwards (for example, towards the top end 106 of the liner 102, which is shown in FIG. 3). The inner surface 67 is reflective to reflect light towards the peripheral wall 110. As described above, the liner 102 is light transmissive such that at least some of the light in the radial gap 140 that impinges upon the exterior surface 118 is received within the peripheral wall 110. The light propagates through the peripheral wall 110 and at least some of the light is emitted from the interior surface 116 of the peripheral wall 110 to illuminate the interior surface 116.

The light in the radial gap 140 may diminish or attenuate with increasing height along the radial gap 140 relative to the lens 104. The light may attenuate from the radial gap 140 as an increasing percentage of the light enters and propagates through the peripheral wall 110 of the liner 102 to illuminate the liner 102. For example, the exterior surface 118 of the peripheral wall 110 receives more light along a first segment at or proximate to the bottom end 108 than along a second segment at or proximate to the top end 106 (shown in FIG. 3). The side wall 68 may include an upper portion 168 and a lower portion 170, where the lower portion 170 is between the upper portion 168 and the bottom wall 66. Although the side wall 68 in the illustrated embodiment is generally linear and does not demarcate a boundary between the upper and lower portions 168, 170, in an alternative embodiment the upper portion 168 may be stepped radially outward (or radially inward) relative to the lower portion 170. Since there is more light in the radial gap 140 closer to the lens 104, the inner surface 67 along the lower portion 170 of the side wall 68 reflects more light towards the exterior surface 118 of the peripheral wall 110 than the inner surface 67 along the upper portion 168.

The greater amount and/or luminous intensity of light in the peripheral wall 110 near the bottom end 108 relative to the light in the wall 110 closer to the top end 106 (shown in FIG. 3) results in more and/or brighter light being emitted from the interior surface 116 near the bottom end 108 than closer to the top end 106. The amount and/or luminous intensity of light emitted from the interior surface 116 may diminish gradually along the height of the peripheral wall 110 with increasing distance from the bottom end 108. As a result, the interior surface 116 appears brighter to an observer at the bottom end 108 relative to the top end 106, and the brightness of the interior surface 116 may gradually fade vertically with increasing proximity to the top end 106. This optical fading effect is shown in FIG. 5.

Figure 5:
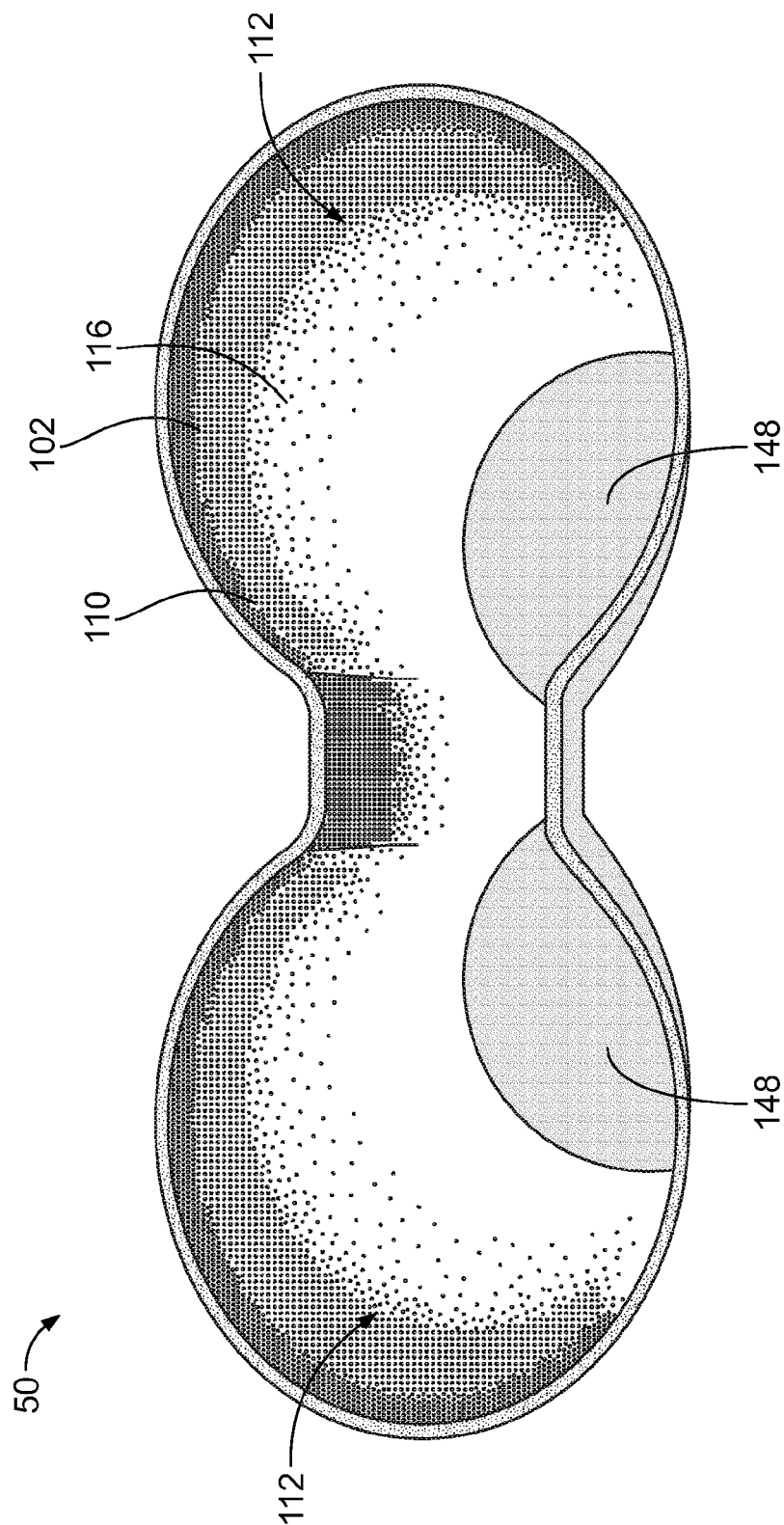
FIG. 5 is a top perspective view of the cup holder assembly according to an embodiment.

FIG. 5 is a top perspective view of the cup holder assembly 50 according to an embodiment. The cup holder assembly 50 is shown in a low light environment in which the cup holder liner 102 is illuminated by the light assembly 74 (shown in FIG. 4). As shown in FIG. 5, the interior surface 116 of the peripheral wall 110 of the cup holder liner 102 is illuminated along a substantial entirety of the height of the peripheral wall 110. The luminous intensity or brightness of the interior surface 116 decreases gradually along the height to provide an optical fading effect. The bottom wall 114 (shown in FIG. 3) does not appear illuminated due to opaque inserts 148 that are disposed in the receptacles 112 on the bottom wall 114. The luminous intensity or brightness of the interior surface 116 decreases gradually along the height to provide an optical fading effect.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A cup holder assembly comprising:
   a lens extending radially to a perimeter edge, the lens configured to receive light from a light source and direct the light towards the perimeter edge; and
   a cup holder liner composed of a light transmissive material and disposed above the lens, the cup holder liner including a peripheral wall that extends between a top end and a bottom end, an interior surface of the peripheral wall defining a receptacle that is open at the top end of the peripheral wall,
   wherein the lens extends beyond an exterior surface of the peripheral wall to define a perimeter edge segment of the lens that protrudes from the exterior surface of the peripheral wall to the perimeter edge of the lens, wherein the lens is configured to emit light from the perimeter edge segment into the peripheral wall through the exterior surface thereof to illuminate the interior surface of the peripheral wall.

2. The cup holder assembly of claim 1, wherein the lens is a planar disc having a diameter that is greater than an outer diameter of the peripheral wall at the bottom end thereof, the outer diameter defined by the exterior surface of the peripheral wall.

3. The cup holder assembly of claim 1, wherein the lens has a top side that faces the cup holder liner above and an opposite bottom side, the perimeter edge being beveled to define an angled surface such that the top side of the lens has a greater diameter than the bottom side, the angled surface configured to reflect light towards the top side of the lens for emission therefrom towards the peripheral wall of the cup holder liner.

4. The cup holder assembly of claim 1, further comprising a cup holder body having a side wall surrounding the peripheral wall of the cup holder liner, the cup holder liner and the cup holder body defining a radial gap extending between the exterior surface of the peripheral wall and an inner surface of the side wall, the perimeter edge segment of the lens configured to emit light into the radial gap.

5. The cup holder assembly of claim 4, wherein the inner surface of the side wall of the cup holder body is reflective to reflect light towards the exterior surface of the peripheral wall of the cup holder liner.

6. The cup holder assembly of claim 4, wherein the peripheral wall of the cup holder liner is angled relative to the side wall of the cup holder body such that a width of the radial gap between the exterior surface of the peripheral wall and the inner surface of the side wall decreases along a height of the peripheral wall from the bottom end towards the top end.

7. The cup holder assembly of claim 1, wherein the lens has an interior region between a top side of the lens that faces the cup holder liner above and an opposite bottom side of the lens, the lens receiving light from the light source into the interior region through the bottom side, the lens emitting light from the interior region through the top side along the perimeter edge segment thereof.

8. The cup holder assembly of claim 7, wherein the lens includes a notch formed in the interior region along a central area of the lens that is spaced apart from the perimeter edge segment of the lens, the notch including at least one angled surface that reflects light received from the light source generally laterally through the interior region of the lens towards the perimeter edge of the lens.

9. The cup holder assembly of claim 1, wherein the cup holder liner has a bottom wall at the bottom end of the peripheral wall, the cup holder assembly further comprising an insert disposed in the receptacle along the bottom wall, the insert configured to at least one of limit or block illumination of an interior surface of the bottom wall.

10. The cup holder assembly of claim 1, wherein the cup holder liner has a bottom wall at the bottom end of the peripheral wall, the cup holder assembly including a cover disposed between the bottom wall of the cup holder liner and the lens, the cover being opaque to prohibit light transmission from the lens directly into the bottom wall of the cup holder liner.

11. A cup holder assembly comprising:
 a cup holder body having a side wall, the side wall including an inner surface defining a cavity of the cup holder body;
 a cup holder liner composed of a light transmissive material, the cup holder liner including a peripheral wall disposed in the cavity, the peripheral wall extending between a top end and a bottom end, an interior surface of the peripheral wall defining a receptacle that is open at the top end of the peripheral wall, an exterior surface of the peripheral wall being spaced apart radially from the inner surface of the side wall to define a radial gap; and
 a lens disposed in the cavity of the cup holder body below the cup holder liner, the lens extending radially to a perimeter edge, the lens configured to receive light from a light source and direct the light towards the perimeter edge, the lens extending beyond the exterior surface of the peripheral wall to define a perimeter edge segment of the lens that protrudes from the exterior surface of the peripheral wall to the perimeter edge of the lens,
 wherein the lens is configured to emit light from the perimeter edge segment into the radial gap, the peripheral wall of the cup holder liner receiving light therein from the radial gap through the exterior surface to illuminate the interior surface.

12. The cup holder assembly of claim 11, wherein the lens has a top side and an opposite bottom side, the lens receiving light from the light source through the bottom side, the lens emitting light from the perimeter edge segment along the top side of the lens.

13. The cup holder assembly of claim 11, wherein the lens has a top side and an opposite bottom side, the perimeter edge of the lens being beveled to define an angled surface such that the top side of the lens has a greater diameter than the bottom side, the angled surface configured to reflect light that is within the lens towards the top side of the lens for emission therefrom into the radial gap.

14. The cup holder assembly of claim 11, wherein the inner surface of the side wall of the cup holder body is reflective and reflects light towards the exterior surface of the peripheral wall of the cup holder liner.

15. The cup holder assembly of claim 11, wherein the peripheral wall of the cup holder liner is angled relative to the side wall of the cup holder body such that the radial gap between the exterior surface of the peripheral wall and the inner surface of the side wall is greater at the bottom end of the peripheral wall than at the top end of the peripheral wall.

16. The cup holder assembly of claim 11, wherein the cup holder liner includes a lip that extends radially outward from the exterior surface of the peripheral wall at least proximate to the top end of the peripheral wall, the lip extending across the radial gap and engaging the side wall to secure the cup holder liner to the cup holder body.

17. The cup holder assembly of claim 11, wherein the cup holder liner has a bottom wall at the bottom end of the peripheral wall, the cup holder assembly further comprising an insert disposed in the receptacle of the cup holder liner along the bottom wall, the insert configured to at least one of limit or block illumination of an interior surface of the bottom wall.

18. The cup holder assembly of claim 11, wherein the lens has an interior region between a top side of the lens that faces the cup holder liner above and an opposite bottom side of the lens, the lens including a notch formed in the interior region along a central area of the lens that is spaced apart from the perimeter edge segment, the notch including at least one first angled surface that reflects light received from the light source generally laterally through the interior region of the lens towards the perimeter edge.

19. The cup holder assembly of claim 11, wherein the interior surface of the peripheral wall of the cup holder liner is illuminated along a substantial entirety of the height of the peripheral wall from the bottom end to the top end.

20. The cup holder assembly of claim 19, wherein a luminous intensity of light emitted through the interior surface diminishes gradually along the height of the peripheral wall with increasing distance from the bottom end.

* * * * *